US008233619B2

(12) United States Patent
Bertoni et al.

(10) Patent No.: US 8,233,619 B2
(45) Date of Patent: Jul. 31, 2012

(54) IMPLEMENTATION OF AES ENCRYPTION CIRCUITRY WITH CCM

(75) Inventors: Guido Bertoni, Carnate (IT); Jefferson E. Owen, Carrollton, TX (US)

(73) Assignees: STMicroelectronics S.r.l., Agrate Brianza (MI) (IT); STMicroelectronics Inc., Coppell, TX (US)

( * ) Notice: Subject to any disclaimer, the term of this patent is extended or adjusted under 35 U.S.C. 154(b) by 1073 days.

(21) Appl. No.: 11/448,425

(22) Filed: Jun. 7, 2006

(65) Prior Publication Data

US 2007/0286416 A1 Dec. 13, 2007

(51) Int. Cl.
*H04K 1/06* (2006.01)

(52) U.S. Cl. .......................... 380/37; 380/28

(58) Field of Classification Search .............. 380/1, 255, 380/264, 277; 713/282, 289; 726/26, 27, 726/28, 29, 30
See application file for complete search history.

(56) References Cited

U.S. PATENT DOCUMENTS

| | | | |
|---|---|---|---|
| 7,221,763 B2 | 5/2007 | Verbauwhede | |
| 7,263,186 B2 | 8/2007 | Chang et al. | |
| 2004/0202317 A1* | 10/2004 | Demjanenko et al. | 380/28 |
| 2005/0008149 A1 | 1/2005 | Lai et al. | |
| 2005/0010802 A1 | 1/2005 | Chang et al. | |
| 2005/0169480 A1 | 8/2005 | Kueh et al. | |
| 2005/0172119 A1 | 8/2005 | Eckhardt et al. | |
| 2006/0126835 A1* | 6/2006 | Kim et al. | 380/44 |
| 2006/0133616 A1 | 6/2006 | Kim et al. | |
| 2007/0081673 A1* | 4/2007 | Ren | 380/270 |
| 2007/0106896 A1* | 5/2007 | Sandberg et al. | 713/170 |
| 2007/0115858 A1 | 5/2007 | Moritomo | |
| 2007/0162610 A1* | 7/2007 | Un et al. | 709/230 |
| 2007/0189522 A1* | 8/2007 | Raju et al. | 380/37 |

(Continued)

FOREIGN PATENT DOCUMENTS

EP 1 161 027 A1 12/2001

OTHER PUBLICATIONS

Duhyun Bae et al., "Design and Implementation of Efficient Cipher Engine for IEEE 802.11i compatible with IEEE 802.11n and IEEE 802.11e," Computational intelligence and security lecture notes in computer science; lecture notes in artificial intelligence; LNCS, Springer-Verlag, BE, vol. 3802, 2005, pp. 439-444, XP019031315 ISBN: 3-540-30819-9, pp. 441-442.

(Continued)

*Primary Examiner* — Brandon Hoffman
*Assistant Examiner* — Nega Woldemariam
(74) *Attorney, Agent, or Firm* — Wolf, Greenfield & Sacks, P.C.

(57) ABSTRACT

Circuitry for encrypting at least a part of an input data flow and generating a tag based on the input data flow with the same ciphering algorithm and the same key, the algorithm including iterative computations by at least two operation units, the circuitry including a pipeline including an input selection unit arranged to receive first data values to generate encryption sequences with the ciphering algorithm, second data values to generate temporary tags with the ciphering algorithm and an output of the pipeline; a first stage arranged to receive an output of the input selection unit and including at least a first operation unit; and a second stage arranged to receive an output of the first stage, including at least a second operation unit and providing the output of the pipeline.

19 Claims, 8 Drawing Sheets

U.S. PATENT DOCUMENTS

2007/0286416 A1     12/2007    Bertoni et al.
2008/0170691 A1*    7/2008    Chang et al. .................. 380/270

OTHER PUBLICATIONS

Search Report dated Oct. 4, 2007 from related European application No. 07 10 4627.

Cam-Winget et al. "Communications of the ACM: Security Flaws in 802.11 Data Link Protocols" May 2003, v. 46, No. 5, p. 35-39.

CCMP AES Encryption Algorithm, 2003, Vocal Technologies p. 1-4.

Jang et al. Compatible Design of CCMP and OCB AES Cipher using separated encryptor and decryptor for IEEE 802.11i, 2004, IEEE, p. 1-4.

Whiting et al., "Counter with CBC-MAC (CCM)", IETF Standard, Internet Engineering Task Force, IETF, CH, Sep. 2003, pp. 1-27, XP015009392, ISSN: 0000-0003.

Vu et al., "FPGA Implementation AES for CCM Mode Encryption Using Xilinx Spartan-II", ECE 679, Advanced Cryptography, Oregon State University, 2003, pp. 1-5, XP002449430.

Search Report dated Sep. 6, 2007 from corresponding European Application No. 07104629.

* cited by examiner

IMPLEMENTATION OF AES ENCRYPTION CIRCUITRY WITH CCM

BACKGROUND OF THE INVENTION

1. Field of the Invention

The present invention relates to the field of data encryption using a symmetric algorithm, more particularly the Advanced Encryption Standard (AES) algorithm. The present invention relates to a circuit and method of encryption in a combined counter and CBC-MAC mode (CCM).

The present invention applies to secured data transmission, more particularly to secured wireless networks.

2. Background of the Invention

Network security related to wireless local area networks (WLANs), for example according to 802.11 (n or i) standards, wireless USB etc., generally requires encryption according to the Advanced Encryption Standard, implemented in CCM mode. The CCM mode provides both privacy, as well as data integrity. To achieve data privacy, data is encrypted using a secret key known to the transmitting and receiving network nodes. Data integrity is ensured by generating a tag (message authentication code—MAC) based on the data to be transmitted, and then recalculating the tag at the receiving end to ensure that data has not been corrupted.

Messages to be transmitted are in the form of data packets. Each packet comprises a header giving information such as the destination address of the data and additional authenticated data which can be used, for example, for authentication of packet header, and a payload. The packet header and any additional authenticated data (grouped hereafter under the name header) are not encrypted as they are used for routing the packet to its destination in the network. However, the header is taken into account to compute the tag. The payload is both encrypted and used to generate the tag, which is also usually encrypted.

Figure 1A:
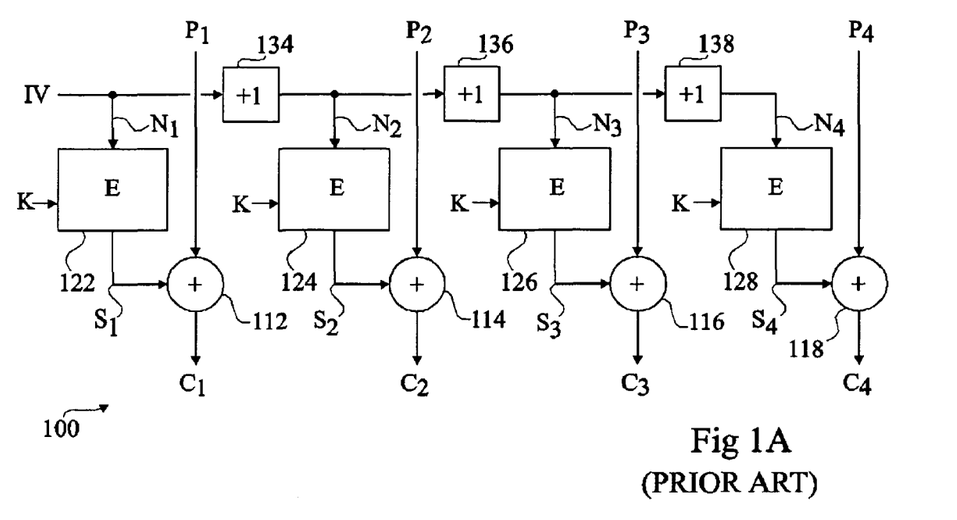
FIG. 1A (already described) illustrates in schematic form a known process for encrypting data blocks.

FIG. 1A is a block diagram illustrating a conventional example of a process 100 for encrypting data packets in counter mode. Header and payload are organized in groups (blocks) of bits the size of which depends on the processing granularity of the process. The example of FIG. 1 illustrates the case when there are four payload data blocks of plain text $P_1$ to $P_4$ to be processed, however the process can be expanded to process any required number of data blocks. Each data block $P_1$ to $P_4$ is combined (XOR gates 112, 114, 116 and 118) with an encryption sequence SI to $S_4$ to produce four blocks of cipher text $C_1$ to $C_4$. Sequences $S_1$ to $S_4$ are generated by encrypting (steps 122, 124, 126 and 128—algorithm E) different nonce values $N_1$ to $N_4$ with the same secret key K. In counter mode, the successive nonce values $N_2$ to $N_4$ are obtained by incrementing (steps 134, 136 and 138) a first nonce $N_1$ corresponding to an initialization value IV (for example, zero) of a counter. Encryption in counter mode is preferred to an encryption in cipher block chaining as the algorithm E can be applied (calculated) before receiving the data block.

In a hardware implementation of the encryption to which the present invention applies, a single unit (logic computation core) implementing the algorithm E is successively loaded with a result value of a counter incremented for each new data block $P_1$ to $P_4$ and the result provided by this unit is linked to a first input of an XOR gate the second input of which receives the current data block. At each data block, the key K is provided to the unit.

Figure 1B:
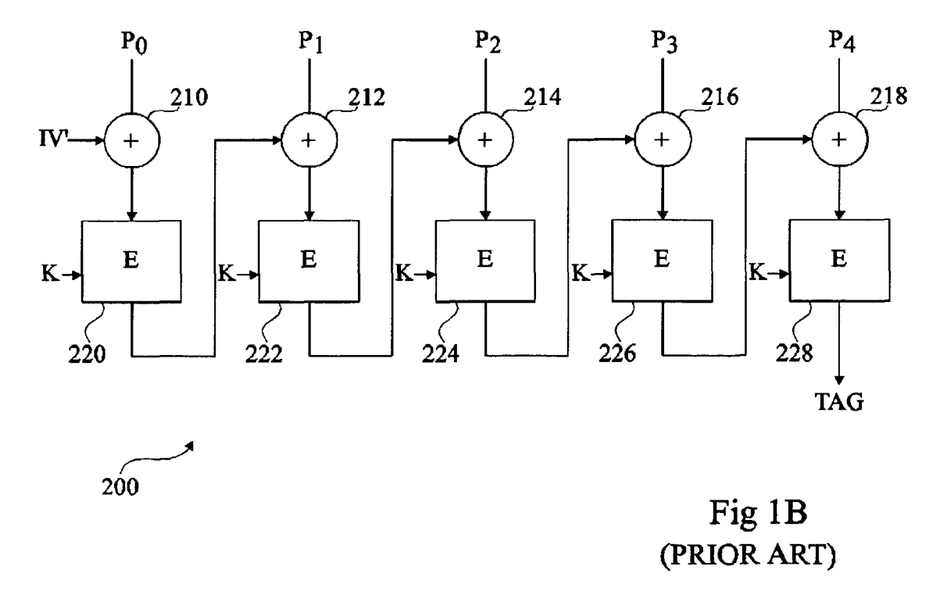
FIG. 1B (already described) illustrates in schematic form a known process for generating a tag.

FIG. 1B is a block diagram illustrating a conventional example of a process 200 for computing, according to a cipher block chaining (CBC) method, data integrity data in the form of a tag. For data integrity, both the header and the payload have to be processed. For simplicity, it is assumed that a data block $P_0$ is the header of a packet comprising payload data blocks $P_1$ to $P_4$. Each data block $P_1$ to $P_4$ is combined (XOR gates 212, 214, 216 and 218) with the result of the application of a same encryption algorithm E (steps 222, 224, 226 and 228) to the former data block. A first data block (here, the header $P_0$) is combined (XOR gate 210), before encryption (block 220), with an initialization value IV' (for example zero). The result of the encryption (output of step 228) of the last data block $P_4$ of the packet provides the message authentication code or. tag. The ciphering key K is the same for each computation of the algorithm E.

For implementing the counter mode, a single logic core computing the algorithm E is used for a hardware implementation of the CBC-MAC. This single core is successively loaded by the output of a circuit forming an XOR gate, a first input of which successively receives the initialization value IV' and the successive results of the algorithm when a second input receives the successive data blocks $P_0$ to $P_4$. Again, at each data block, the key K is provided to the circuit.

Figure 2:
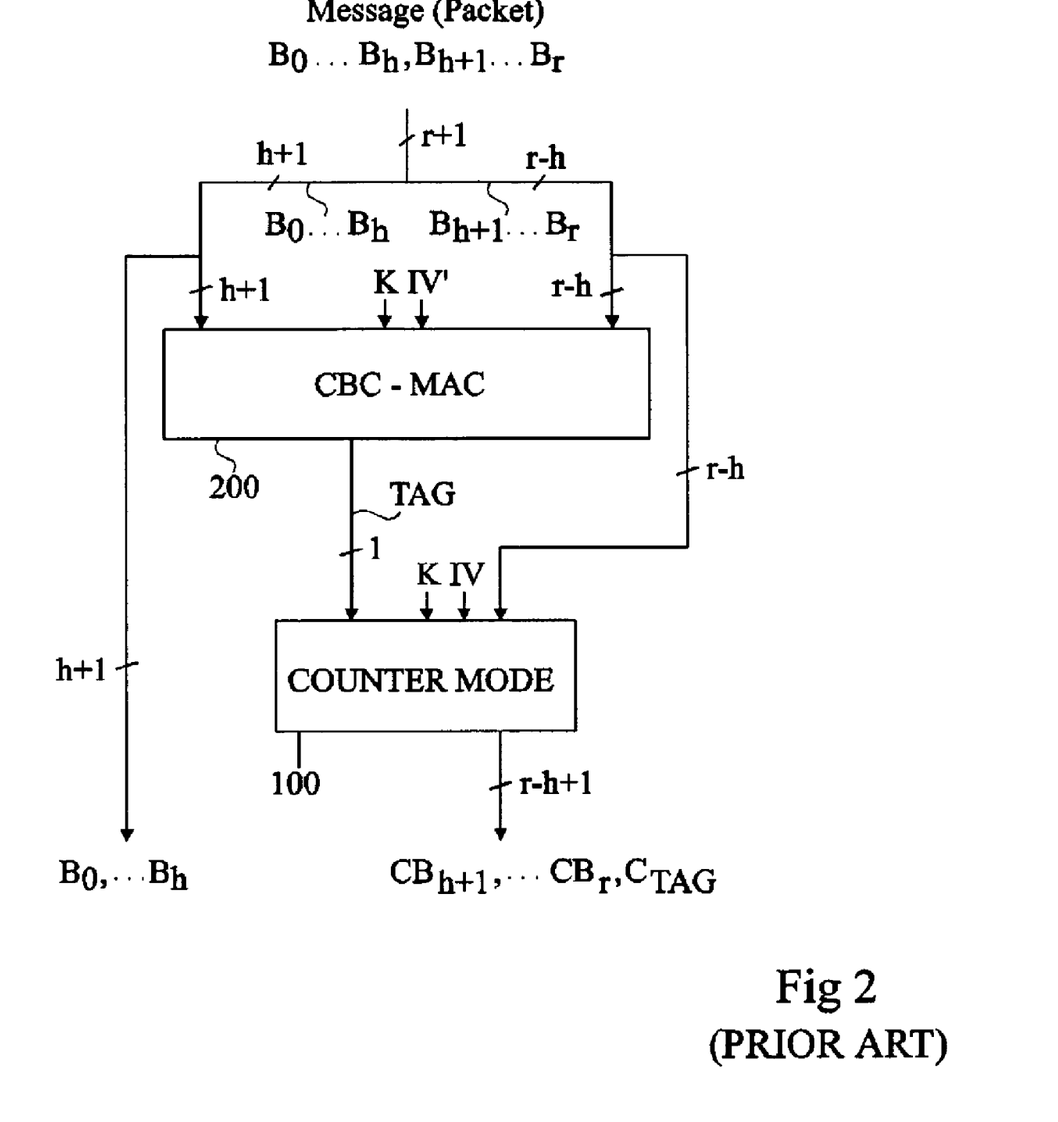
FIG. 2 (already described) illustrates in schematic form a known process for encrypting data and generating a tag.

FIG. 2 illustrates in a schematic form a conventional example of a process for combining the counter mode and the CBC-MAC computation in order to provide both privacy and integrity.

Assuming a message (in the form of data packet) comprising r+1 data blocks $B_0$ to $B_r$ including h+1 blocks $B_0$ to $B_h$ representing the packet header (and additional authenticated data). Which are not to be encrypted and r-h payload data blocks $B_{h+1}$ to $B_r$ to be encrypted. All the blocks are processed according to the process 200 (CBC-MAC) of FIG. 1B to generate a tag. The payload data blocks are processed a second time according to the counter mode process 100 of FIG. 1A to obtain ciphered blocks $CB_{h+1}$ to $CB_r$. The first h+1 blocks $B_0$ to $B_h$ are sent over the network with the r-h ciphered blocks $CB_{h+1}$ to $CB_r$ and the tag CTAG (usually ciphered using the counter mode).

By recalculating the tag at the destination based on the decrypted blocks, and comparing this to the transmitted tag, the data integrity of the received packet can be checked. The key K and the initialization values IV and IV' have to be known by the receiver. Therefore choosing zero for the IV's avoids the need to transmit them.

According to the method described above, every part of the payload of a message to be transmitted is processed twice, once for encryption and a second time for data integrity. Known hardware implementations provide a single computing core, surrounded by suitable logic and registers such that it can be used once for encryption and then for data integrity. Whilst the header of each packet need only be processed for the generation of the tag, it is the payload of the packet that forms the majority of the data in each packet, and thus the throughput is limited by two full processing cycles of the payload of each packet. This solution is thus disadvantageous in that it is slow and inefficient at performing the required algorithm.

This drawback is particularly present for encryption algorithms using a key schedule (for example, the AES algorithm), i.e. according to which, for each block to be processed, sub-keys are generated from a key K and are successively used in rounds of an iterative process. In such algorithms, computation time of the CCM mode encryption can be critical for the rate of transmission of the data.

An example of the known method described above applied to the AES is disclosed in "FPGA Implementation AES for CCM Mode Encryption Using Xilinx Spartan-II"—Khoa Vu, David Zier—ECE 679, Advanced Cryptography, Oregon State University, Spring 2003.

SUMMARY OF THE INVENTION

The present invention aims to at least partially address the above problems discussed in relation to the prior art.

The present invention more specifically aims at providing a fast unit for both encrypting and/or decrypting data for privacy and generating and/or verifying a tag for integrity, in a combined counter and CBC-MAC mode (CCM mode).

According to a first aspect of the present invention there is provided circuitry for encrypting at least a part of an input data flow and generating a tag based on said input data flow with a same ciphering algorithm and a same key, said algorithm comprising iterative computations by at least two operation units, said circuitry comprising a pipeline comprising: an input selection unit arranged to receive first data values to generate encryption sequences with said ciphering algorithm, second data values to generate temporary tags with said ciphering algorithm and an output of the pipeline; a first stage arranged to receive an output of said input selection unit and comprising at least a first operation unit; and a second stage arranged to receive an output of the first stage, comprising at least a second operation unit and providing said output of the pipeline.

According to a second aspect of the present invention there is provided circuitry for decrypting at least a cipher part of an input data flow and generating a tag based on said input data flow with a same algorithm and a same key, said algorithm comprising iterative computations by at least two operation units, said circuitry comprising a pipeline comprising: an input selection unit arranged to receive first data values to generate decryption sequences with said ciphering algorithm, second data values to generate temporary tags with said ciphering algorithm and third data values representing an output of the pipeline; a first stage receiving an output of said input selection unit and comprising at least a first operation unit; and a second stage receiving an output of the first stage, comprising at least a second operation unit and providing said output of the pipeline.

BRIEF DESCRIPTION OF THE DRAWINGS

The foregoing and other purposes, features, aspects and advantages of the invention will become apparent from the following detailed description of a number of embodiments, which is given by way of illustration only without limiting the invention, and throughout which reference is made to the accompanying drawings in which.

DETAILED DESCRIPTION

For reasons of clarity, only steps and elements which are useful for the understanding of the present invention have been shown and will be described. In particular, details of the steps of each round of the AES algorithm and of the key schedule have not been described, the present invention being compatible with any conventional application of the AES algorithm.

The present invention will be described in connection with an application to an AES algorithm. However, it applies more generally to any symmetric algorithm using a key schedule, such as for example DES, RC5 (Rivest cipher 5) or RC6, i.e. the operation of which can be shared in a data part processing the plain text (ciphering) or the cipher text (deciphering) and a key part extracting sub-keys from a (secret) key to be used in rounds of the data part. The simplest key schedule is a duplication of key. However, the key schedule preferably generates a function of the secret key, different for each round.

In such algorithms the key schedule usually occupies a significant area in a hardware implementation. The present invention takes benefit from the fact that the same key is used for both computing the counter mode and the cipher block chaining message authentication code.

Figure 3:
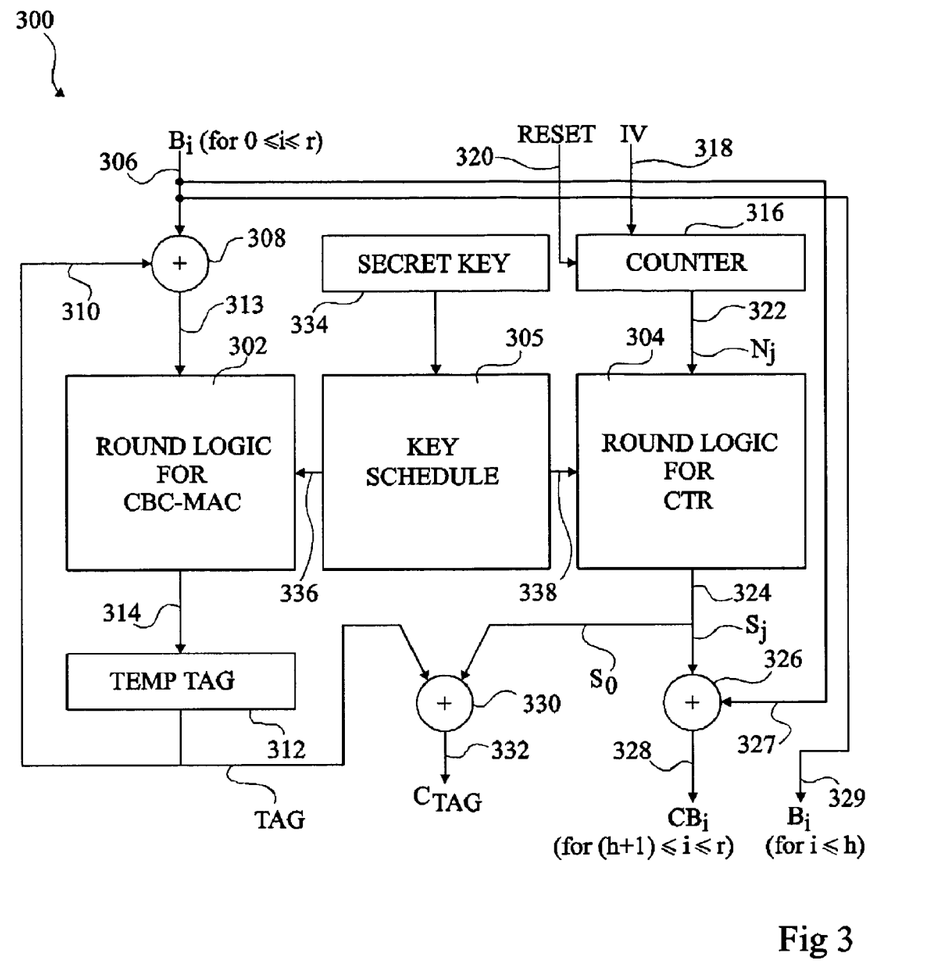
FIG. 3 illustrates in schematic form circuitry for encrypting data and generating a tag according to a first embodiment.

FIG. 3 illustrates in schematic form a processing unit 300 for performing both encryption for privacy and tag generation for integrity according to a first embodiment.

As shown in FIG. 3, processing unit 300 comprises a first round logic unit 302 for generating a tag according to CBC-MAC (Cipher Block Chaining Message Authentication Code), a second round logic unit 304 providing counter mode functionality for encrypting packet payloads, and a common key schedule unit 305 for generating sub-keys to be provided to both the first and second, preferably identical, round logic units 302 and 304.

The unit 300 receives blocks $B_i$ (i taking successively the values 0 to r, where r+1 represents the total number of data blocks) to be processed on input line 306. Input line 306 and the other lines described herein below are in fact parallel data lines each providing a communication route for a number of data bytes or bits in parallel. Input line 306 is connected to a first exclusive OR (XOR) gate 308 which also receives an input on line 310 from a temporary tag register 312. XOR gate 308 performs the XOR function on the signals on lines 306 and 310 and provides the result on line 313 to the first round logic unit 302. The first round logic unit 302 performs the encryption algorithm (for example AES) on this data, and provides the result on line 314 to the temporary tag register 312, which stores the result before providing the result back to XOR gate 308 on line 310 ready to be added bit by bit to the next input data block. Elements 308, 302 and 312 perform a CBC-MAC computation branch reusing the same unit 302 for each computation of the encryption algorithm. The initialization value is, for example, given by the initial contents (preferably zero) of the register 312.

A counter 316 is provided comprising an input for receiving an initialization value IV (for example, zero) on line 318 and a reset input for receiving an input signal on line 320. The counter adds 1 on every full cycle of the second round logic unit 304, and the resulting counter value $N_j$ (j taking successively and arbitrarily the values 0 and 1 to r−h−1, where h+1 represents the number of header data blocks) is provided on line 322 to the second round logic unit 304. Unit 304 performs the encryption algorithm, which is the same encryption algorithm as performed by the first round logic unit 302, and provides the result on line 324 which is connected to a second XOR gate 326. Unit 304 computes encryption sequences $S_j$ in counter mode to be combined with the payload data blocks $B_i$. The second XOR gate 326 also receives the data block $B_i$ (h+1≦i≦r) on line 327. The second XOR gate 326 provides an output on line 328 which is the encrypted data block $CB_i$. In particular, encryption sequence $S_1$ is used to encrypt the data block $B_{h+1}$, the encryption sequence $S_2$ is used to encrypt data block $B_{h+2}$ etc.

Elements 316, 304 and 326 perform a counter mode computation branch reusing the same unit 304 for each computation of the encryption algorithm.

The key schedule unit 305 receives a secret key 334, which is known to both the transmitting and receiving parts (for example the nodes of a communication network). Based on the secret key 334, the key schedule block 305 generates a series of sub keys $K_I$, (I taking successively the values 0 to n, where n represents the number of rounds of the ciphering algorithm) which are provided both to the first round logic unit 302 on line 336 and to the second round logic unit 304 on line 338.

The elements of processing unit 300 also receive synchronization and control signals not shown in FIG. 3 for controlling the operation of the circuitry as will now be described. Processing unit 300 is preferably a logic array, and can be programmable (FPGA) or not.

The first and second round logic units process in parallel the data blocks $B_i$ for generating the tag and the nonce values $N_j$ generated by counter 316 for encrypting the data blocks, but the n+1 sub-keys for each computation of the AES (for each block) are generated by the shared key schedule unit 305. For blocks $B_0$ to $B_h$, the unit 304 is not activated. The data blocks $B_0$ to $B_h$, which are not encrypted, are output on line 329 directly from the input line 306 and are processed in parallel by the unit 302. When the $B_{h+1}{}^{th}$ data block arrives at input line 306, both units 302 and 304 are active and the IV is also provided on input line 318. The data blocks $B_{h+1}$ to $B_r$ are processed by the unit 302 and in parallel (using the same sub-keys) the count values $N_j$ are ciphered by unit 304 which generates the encryption sequences $S_j$ for encryption of the data blocks at the XOR gate 326. Once the $B_r{}^{th}$ data block has been encrypted and processed by the first round logic unit 302, the tag at the output 314 is the final tag to be transmitted.

Preferably, an initial encryption sequence $S_0$ is used to encrypt the tag. The content of the TEMP TAG register 312 is provided to a third XOR gate 330 for encrypting the tag. In a final iteration of the second unit 304 alone, the counter 316 is reset (line 320), and the second round logic unit performs the algorithm on the initialization value (first nonce $N_0$). The result is provided on line 324 to the third XOR gate 330. The XOR function is applied to this value and the tag from the TEMP TAG register 312, and the output on line 332 is the encrypted tag $C_{TAG}$ which can be sent with the encrypted data $CB_i$ (h+1≦i≦r) and the packet header $B_i$ (0≦i≦h).

An advantage of using the initial sequence $S_0$ for encrypting the tag is that tag encryption can be performed irrespectively of the number r−h of data blocks that are to be encrypted. In alternative embodiments, rather than resetting the counter to generate to the initial encryption sequence $S_0$ for encrypting the tag, the encryption sequence $S_0$ is generated during processing of the data block $B_{h−1}$ and is stored in a register. It can then be reused for encrypting the tag.

In the example of the AES, the encryption and tag generation performed by the first and second unit 302, 304 both use a series of either 11, 13 or 15 sub-keys of 128 bits, generated by the key schedule circuit 305, the number of rounds computed by each unit 302 or 304 being 11, 13 or 15 respectively. Each block of data (circuit 302) or nonce (circuit 304) to be processed is 128 bits. According to some alternative embodiments the initial key addition is included in the first round and then the encryption is executed in 10, 12 or 14 clock cycles.

Figure 4:
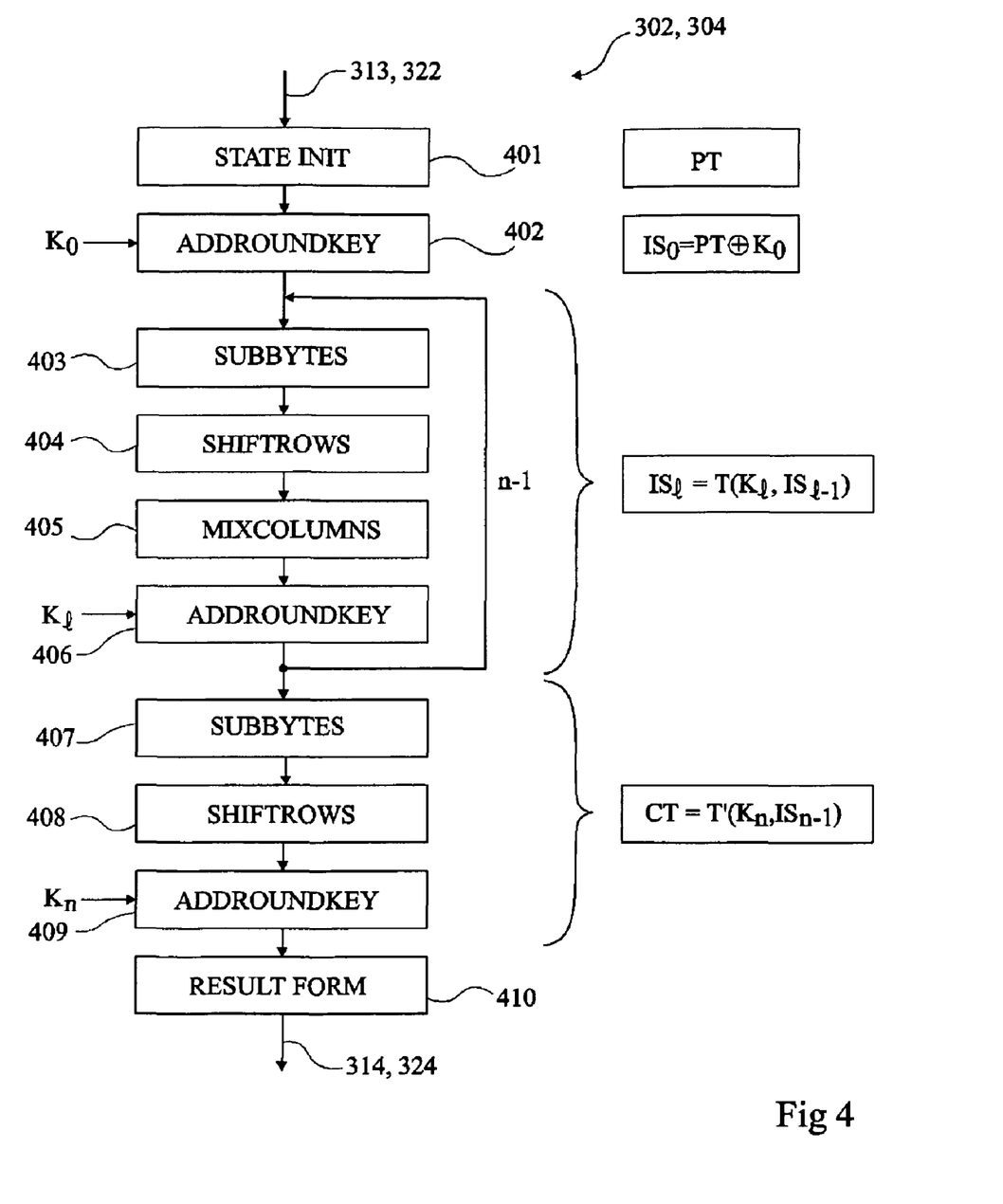
FIG. 4 illustrates in schematic form the key stages in an encryption algorithm according to the Advanced Encryption Standard.

FIG. 4 is a block diagram illustrating the operation of identical round logic units 302 and 304 for the AES. This encryption algorithm is described in more detail in the publication "The Design of Rijndael" by Joan Daemen and Vincent Rijmen, available from Springer-Verlag (ISBN 3-540-42580-2) and in the AES standard (FIPS PUB 197).

The algorithm encodes blocks of plain text (data or nonce) each comprising 128 bits into an encoded block of the same size. Each step in the algorithm processes a matrix of four rows and four columns, each element in the matrix being a byte such that the matrix represents a total of 128 bits.

The process starts with an initial state 401 (STATE INIT) of the four by four data matrix PT to be encrypted.

The first step 402 (ADDROUNDKEY) comprises performing an XOR operation bit by bit on each of the elements of the matrix with the first sub-key $K_0$ to obtain a first intermediate state $IS_0$. The sub-key is generated by the key schedule unit as described above.

The second step in the process comprises performing a number n−1 of rounds of the same transformation T, providing an intermediate state $IS_I$ by processing the previous intermediate state $IS_{I−1}$ and a current sub-key $K_I$. The number n−1 of rounds required is the number of sub-keys generated minus 2. If the secret key is 128 bits, eleven sub-keys are generated, and therefore this transformation is repeated nine times. Each transformation T comprises four operations.

A first operation 403 (SUBBYTES) comprises a non-linear transformation in which each byte of the matrix of the previous state $IS_{I−1}$ is replaced by its image in a pre-calculated substitution table, known as an S-box. The S-box can be obtained by the combination of two transformations, a first which inverses each byte of the matrix in the limited field of size $2^8$ (to correspond to a byte), each byte being replaced by its own image. This inversion is followed by an affine transformation. Since 128 bits are encrypted every round, sixteen S-boxes are required in total.

The second operation 404 (SHIFTROWS) comprises performing a rotation on the three bottom rows of the matrix resulting from the previous operation 403, and rotates the second row by one byte, the third row by two bytes, and the fourth row by three bytes. The first and second operations can be inverted.

A third operation 405 (MIXCOLUMNS) comprises considering each column of the matrix resulting from the previous operation as a polynomial within the limited field of size $2^8$, and multiplying each of these polynomials by a combination polynomial P[X] modulo a polynomial M[X].

A fourth and final operation 406 (ADDROUNDKEY) comprises applying the current sub-key $K_I$ by performing the XOR function bit by bit with each bit of the sub-key and each bit of each byte of the matrix resulting from the previous operation 405. This operation is the same as the operation 402, but with a different sub-key and provides intermediate state $IS_I$. At the end of the n−1$^{th}$ round, operation 406 provides intermediate state $IS_{n−1}$.

Next, a transformation T', forming the last round, processes the intermediate state $IS_{n-1}$ and last sub-key $K_n$. Transformation T' performs successively SUBBYTE operation 407, SHIFTROWS operation 408 and ADDROUNDKEY operation 409 using the last sub-key $K_n$. Hence, transformation T' corresponds to transformation T without the MIXCOLUMNS operation.

If needed, a last step 410 (RESULT FORM) puts the result (ciphered text CT) into the appropriated form to be outputted (on line 314 for unit 302 and on line 324 for unit 304).

Whilst FIG. 4 illustrates multiple identical steps, for example three ADDROUNDKEY steps 402, 406 and 409, in practice only one function unit need be provided for performing each operation. Thus a total of four function units are required for the four operations, and the matrix can be passed through each of these units the required number of times, the appropriate function unit being activated -on each cycle. Furthermore, inputs and/or outputs of the operations are usually buffered for synchronization purposes.

The sub-keys, a different one of each round of the encryption algorithm, are generated by the key schedule unit. The key schedule uses S-boxes to generate the sub-keys from the key K. Four S-boxes are used for generating the n+1 sub-keys and are either to be stored or computed for each data block.

Figure 5:
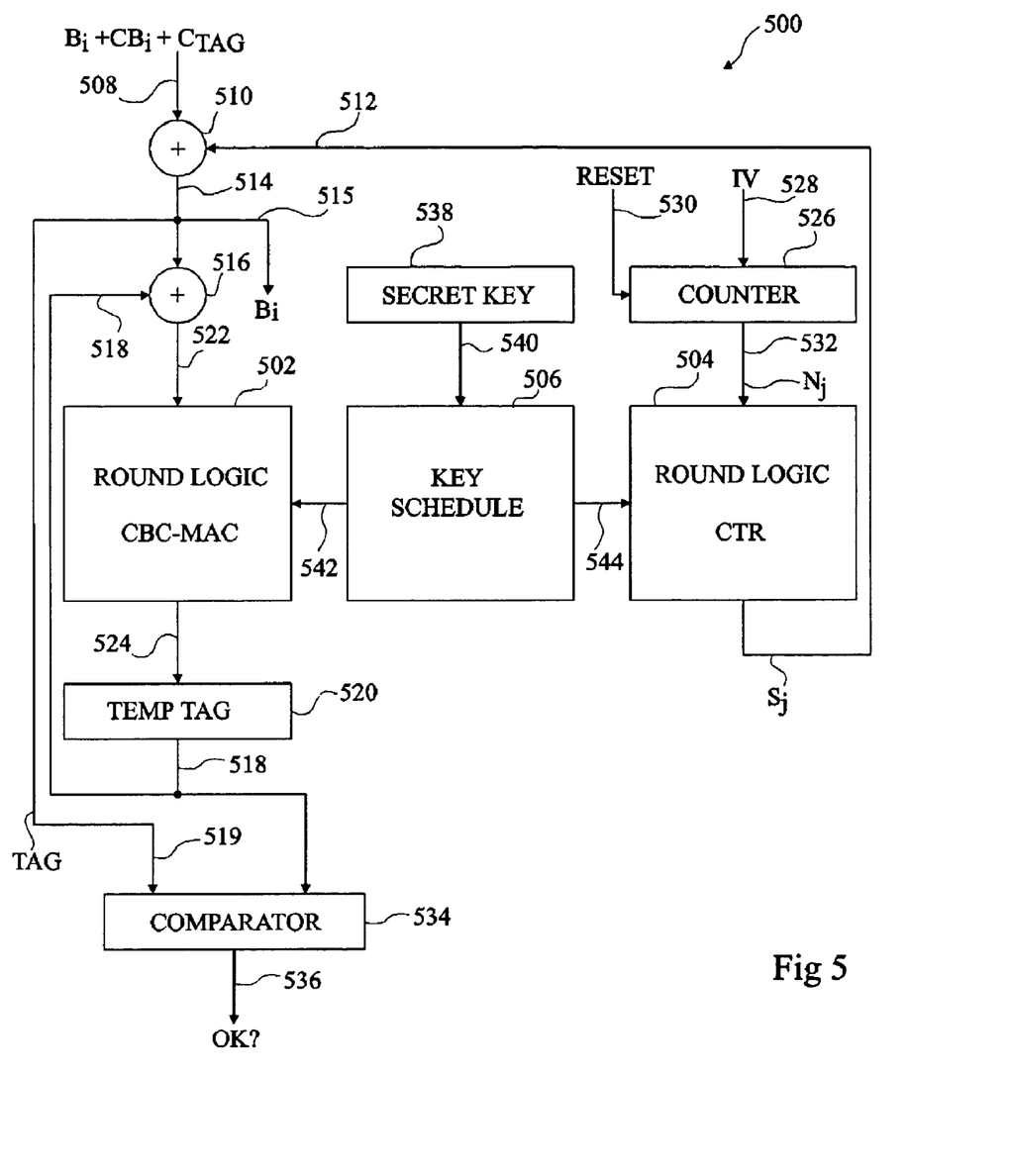
FIG. 5 illustrates in schematic form circuitry for decrypting data and generating a tag according to the first embodiment.

FIG. 5 illustrates in schematic form a processing unit 500 for decrypting encrypted messages at the destination node according to the first embodiment. The circuitry 500 comprises a first round logic unit 502 for implementing CBC-MAC, a second round logic unit 504 for implementing counter mode, and a key schedule unit 506 for generating sub-keys for use by the first and second round logic units. The processing unit 500 receives on an input line 508 data blocks $B_i$, for i between 0 and h, which represent the header (and additional authenticated data) and are not encrypted, the encrypted data blocks $CB_i$, for i between (h+1) and r, representing the payload, and the encrypted tag $C_{TAG}$. These blocks are added bit by bit to the current sequence $S_j$ provided by the second round logic unit 504 by XOR gate 510, however a value will only be provided on line 512 when payload data blocks $CB_{h+1}$ to $CB_r$ and encrypted tag $C_{TAG}$ are being processed as no decryption is required for the header. For data blocks $B_0$ to $B_h$ zeros will be provided on line 512 to XOR gate 510, such that these data blocks pass through gate 510 to output line 514 without being altered. The decrypted output of XOR 510 is provided on line 514, and represents the decrypted blocks of data $B_i$, which are also output directly on an output line 515.

The output on line 514 is also provided to a second XOR gate 516 where it is added bit by bit to the output on line 518 of a temporary tag register 520. The output of XOR gate 516 is provided on line 522 to the first round logic unit 502. The result is provided to be stored in the temporary tag register 520 on line 524.

As with the encrypting processing unit 300, the second round logic unit 504 generates the encryption sequences $S_j$ based on count values (nonce values $N_j$) from a counter 526 which receives an initialization value IV on line 528 and a reset signal on line 530. On each cycle, the counter adds 1, and outputs the value on line 532.

Units 304 and 504, and 302 and 502 respectively, are identical.

The secret key 538, which is the same secret key as that used by processing unit 300, is provided to the key schedule unit 506 on line 540. The key schedule unit calculates a sub-key for each round of the first and second round logic units, and outputs these on both line 542 to the first round logic unit 502 and line 544 to the second round logic unit 504. The order of generation of the sub-keys is the same for encrypting and decrypting.

As for FIG. 3, elements of unit 500 receive control and synchronization signals (not shown).

Once the tag has been calculated using all of the data blocks $B_i$, the result is provided to a comparison unit 534 on line 518. Comparator 534 also receives the decrypted tag on line 519. The received tag $C_{TAG}$ is decrypted using, as for encryption, the initial sequence $S_0$, which is calculated by resetting counter 526 to the IV, or in an alternative embodiment stored in a register when originally generated during processing of block $B_{h+1}$. Sequence $S_0$ is provided on line 512 to XOR gate 510 to decrypt the tag, and the decrypted tag is then provided on line 519 to the comparator.

The comparator 534 provides a result on line 536 indicating whether the tags match. If the tags match, the decrypted data blocks are deemed to be accurate, and can be processed as required. If the tags do not match however, this implies that the data has been corrupted, and therefore all the received data blocks and the tag are, for example, destroyed.

The tag generation and ciphering (FIG. 4)—or deciphering (FIG. 5)—according to the first embodiment require r+2 cycles, compared to the 2(r+1)-h cycles required with the known solution of FIG. 3.

Figure 6:
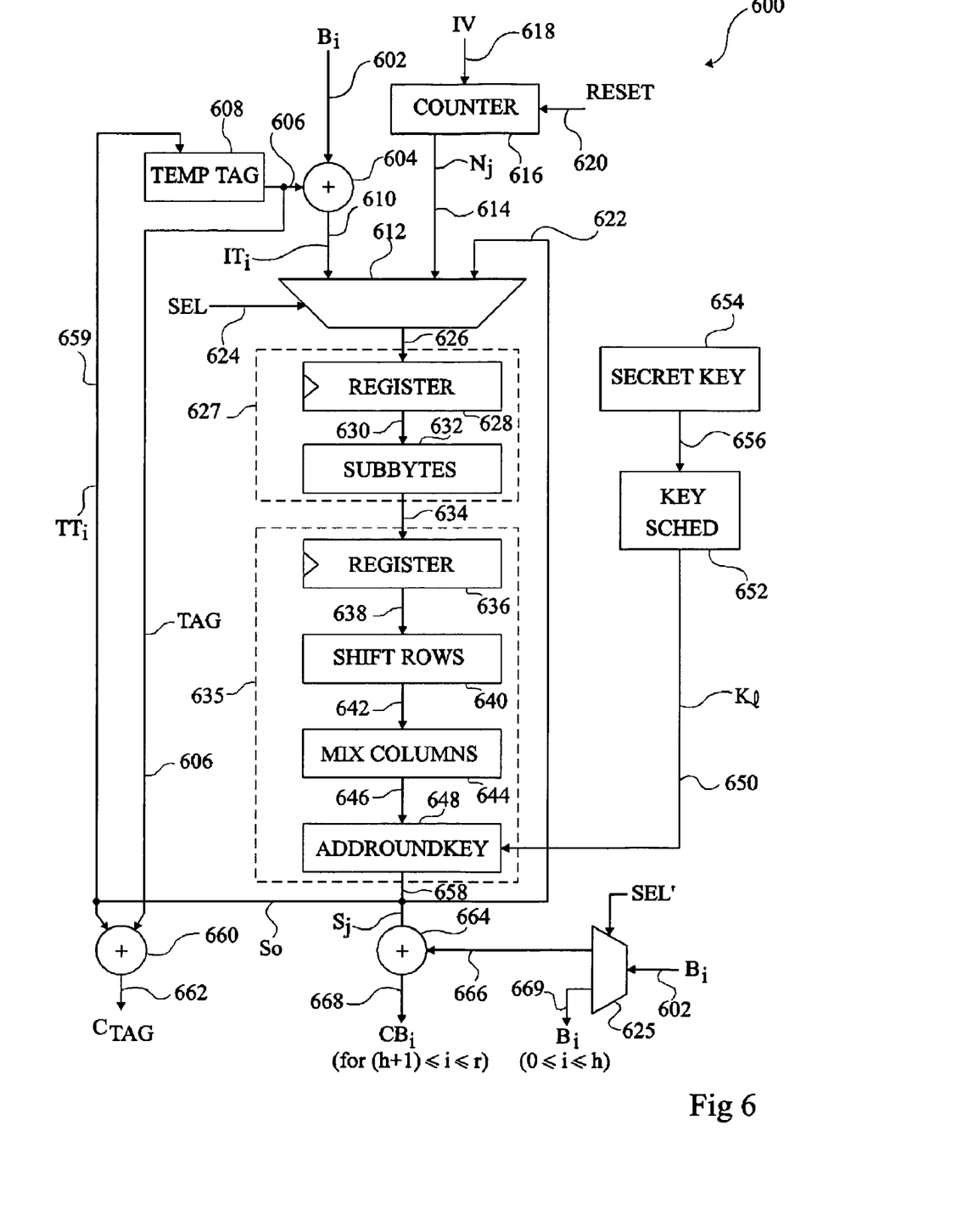
FIG. 6 illustrates in schematic form pipelined circuitry for encrypting data and generating a tag according to a second embodiment.

FIG. 6 illustrates encryption processing unit 600 for encrypting data blocks $B_i$, and for generating a tag for data integrity according to a second embodiment. As will now be described, the encryption unit 600 is pipelined. Furthermore, a single pipeline is used for providing the functionality of both the CBC-MAC and counter mode round logic units.

Data blocks $B_i$ are received on an input line 602 and added bit by bit, by an XOR gate 604, to the output 606 of a temporary tag register 608. The output of XOR gate 604 is provided on line 610 to a first input of a three input multiplexer 612. Multiplexer 612 also receives at a second input an input on line 614 from a counter 616 which receives an initialization value on line 618 and adds 1 on each payload data block cycle. The counter also receives a reset input on line 620. At a third input, multiplexer 612 receives a signal on line 622 from the output of the pipeline.

A select input line 624 is provided for receiving an input signal SEL that selects which input of multiplexer 612 is selected for output on output line 626 of the multiplexer.

The output line 626 is connected to a first stage 627 of the pipeline. The first stage comprises a register 628 connected by line 630 to an unit 632 performing the SUBBYTES operations as described above with references 403 and 407 of FIG. 4. Register 628 acts as a buffer buffering data blocks received via the multiplexer 612. The SUBBYTES operation is particularly demanding on processing time and therefore it is preferable to arrange the pipeline with this function as the only function in a stage.

The output of unit 632 is provided to a second stage 635 of the pipeline on line 634. The second stage comprises a register 636 for buffering the data output from unit 632. The register outputs data values on line 638 to a unit 640 performing the SHIFTROWS operations 404 and 408 of FIG. 4. The output of unit 640 is provided on line 642 to a unit 644 performing the MIXCOLUMNS operation 405 of FIG. 4.

The output of the unit 644 is provided on line-646 to a unit 648 performing the ADDROUNDKEY operation which receives sub-keys $K_j$ on line 650 from a key schedule unit 652. The key schedule unit.652 generates sub-keys based on a secret key 654 provided on line 656.

The output of the unit 648 on line 658 provides the output of the second stage 635 of the pipeline. This data value is selectively provided to the temporary tag register 608 on line 659, and to the multiplexer 612 on line 622. The output is also provided to an XOR gate 660 which also receives the output of the temporary tag register on line 606, and generates the encrypted tag $C_{TAG}$ on its output line 662. The second stage output is also provided to an XOR gate 664 which also receives on line 666 the payload data block $B_i$ to be encrypted and performs the XOR function bit by bit providing the encrypted data block $CB_i (h+1 \leq i \leq r)$ on line 668. Line 666 is one of two outputs of a further multiplexer 625, the single input of which is connected to line 602. The second output of multiplexer 625 outputs the header data blocks $B_0$ to $B_h$, which are not encrypted, on line 669.

The processing unit 600 of FIG. 6 operates by alternatively processing first count values provided by counter 616 for generating encryption sequences for encrypting the data blocks, and processing input data blocks for calculating the tag, the second stage being used for ending a round with either the nonce or the data associated with the current data block while the first stage starts another round with the data or the nonce. It should be noted that the same sub-key is needed for each round of the CBC-MAC algorithm for calculating the tag as for the equivalent round of the counter algorithm.

The pipelined round is controlled to perform the same operations as disclosed in relation to FIG. 4. The header and payload of each packet is provided on line 602. For each data block $B_0$ to $B_h$ of the header (and associated data) which is only used to generate the tag and not encrypted, the pipeline operates only generating temporary tags $TT_i$.

For each data block $B_0$ to $B_{h-1}$, the result of the combination of data block $B_i$ with a previous temporary tag $TT_{i-1}$ (initialized with zero for combination with block $B_0$) is loaded into the pipeline via multiplexer 612. This result is an intermediate tag $IT_i$. On the first round only the ADDROUNDKEY unit 648 is used, and therefore the data block passes through the SUBBYTES unit 632 without being processed and is stored in register 636. Then, the data block passes straight through the SHIFTROWS unit 640 and the MIXCOLUMNS unit 644 without being processed and is added bit by bit by the ADDROUNDKEY unit 648 to the first sub-key $K_0$ generated by the key schedule unit 652. The output (intermediate state $IS_0$) is returned on line-622 to the multiplexer 612. On the second round and on subsequent rounds until the n−1th round, SUBBYTES operation 632 is applied, as are all of the operations in the second stage of the processing unit 600. At the end of each round, the intermediate state $IS_I$ is passed back on line 622 to be processed again. On the $n^{th}$ and final round, all of the functions are applied except for the MIXCOLUMNS unit 644, and the output of the ADDROUNDKEY unit represents the temporary tag $TT_i$ which is stored in the register 608, ready to be combined with the next data block to be processed.

When the $B_h^{th}$ data block is to be processed, the encryption of the first payload data blocks $B_{h+1}$ can be prepared by encrypting nonce $N_{h+1} (=IV+1)$ to obtain the corresponding encryption sequence $S_{h+1}$ for the counter mode. Data block $B_h$ is provided on line 602, and combined at XOR gate 604 with the temporary tag $TT_{h-1}$ to produce the intermediate tag noted $IT_h$ on line 610. An IV value is also provided on line 618, which is provided via counter 616 as a nonce $N_{h+1}$ to the multiplexer 612 on line 614. On a first half round period, the value $IT_h$ is selected by the multiplexer 612 to be loaded into the pipeline and is transferred to register 636 (without processing). On a second half round period, the nonce $N_{h+1}$ on line 614 is selected to be loaded into the pipeline and transferred to register 636 (without processing). During this second half round period, the first sub-key $K_0$ is applied to the value $IT_h$ to produce the first intermediate state $IS_0 (IT_h)$ of the encryption of the value $IT_h$ which is transferred, through line 622 and multiplexer 612, to register 628. On a third half round period, the intermediate state $IS_0(IT_h)$ is processed by the first stage 627 (SUBBYTES operation) and the result is transferred to register 636 while the first sub-key $K_0$ is applied to the nonce $N_{h+1}$ to produce the first intermediate state $IS_0(N_{h+1})$ of the encryption of the nonce $N_{h+1}$ which is transferred, through line 622 and multiplexer 612, in register 628.

The same pipelined processing is reproduced for each intermediate state, the intermediate state $IS_I(IT_h)$ of rank I of the intermediate tag being processed by the first stage 627 while processing the previous intermediate value $IS_{I-1}(N_{h+1})$ of the nonce by the second stage 635 and the intermediate state $IS_I(N_{h+1})$ of rank I of the nonce being processed by the first stage 627 while processing of the intermediate value $IS_I(IT_h)$ of the same rank of the intermediate tag by the second stage 635. The current sub-key is buffered at the output of unit 652 or at the input of unit 648 to remain available for two successive computations by the second stage. Preferably, the sub-key $K_I$ is computed by unit 652 during the half period where the intermediate state $IS_{I-1}$ of the intermediate tag $IT_h$ is processed by the first stage 627 and the intermediate state $IS_{I-1}$ of the nonce $N_{H+1}$ is processed by the second stage 635. On the $2(n+1)^{th}$ half period, first and second stages process intermediate states of rank n−1. The second stage produces the ciphered value of the intermediate tag $IT_h$ which represents temporary tag $TT_h$ of rank h. On the $(2n+3)^{th}$ half period, the second stage produces the encryption sequence $S_{h+1}$ which is combined (gate 664) with the data block $B_{h+1}$ arriving on line 666 (trough the multiplexer 625 and line 602) to produce the first ciphered block $CB_{h+1}$. The data block $B_{h+1}$ is also combined (gate 604) with the temporary tag $TT_h$ and the resulting intermediate tag $IT_{h+1}$ transferred in the register 628 through the multiplexer 624. Further, the counter is incremented to produce the nonce $N_{h+2}$ on line 614. Then, the operation explained above is reproduced for value $IT_{h+1}$ and nonce $N_{h+2}$, and so on until value $IT_{r-1}$ and nonce $N_r$.

The first half round period of a cycle processing value $IT_i$ and nonce $N_{i+1}$ corresponds to the last half round period ($(2n+3)^{th}$) of a cycle processing value $IT_{i-1}$ and nonce $N_i$. Hence, n+1 round periods are enough to process both ciphered data block and corresponding temporary tag.

On the $(2n+3)^{th}$ half period of the n+1 cycle, as the $Br^{th}$ is combined with the sequence $S_r$ to produce the last cipher block $CB_r$, the counter 616 is reinitialized (signal reset 620) to produce the nonce $N_0$ (preferably equal to the initialization value IV). Both stages are used, in a non-pipelined fashion as explained for the h+1 first blocks, to produce a Sequence $S_0$. This sequence is inputted with the content of the register 608 to XOR gate 660 to produce the ciphered tag $C_{TAG}$.

The tag generation and ciphering (FIG. 6) according to the second embodiment require approximately r+3 cycles compared to the 2(r+1)−h cycles required with the known solution of FIG. 3. Further, this second embodiment saves approximately the area of a round logic unit of the first embodiment.

According to an alternative embodiment, the first sequence $S_0$ is computed in a pipelined way with the intermediate tag $IT_{h-1}$ and stored in a buffered input of gate 660. An additional cycle is then saved.

Other alternatives can be provided, for example the positioning of the registers organizing the pipeline can be varied. Further, even if the sharing of the operations presented in FIG. 6 is a preferred embodiment for time saving, the SHIFTROWS operation can be provided in the first stage (for example, before the SUBBYTES operation). Furthermore, a round could be sub-divided further, providing additional pipeline stages, or the stages could be arranged in a different manner.

Pipelined decryption of data can be provided by similar circuitry to the encryption circuitry 600 used for encryption of data.

Figure 7:
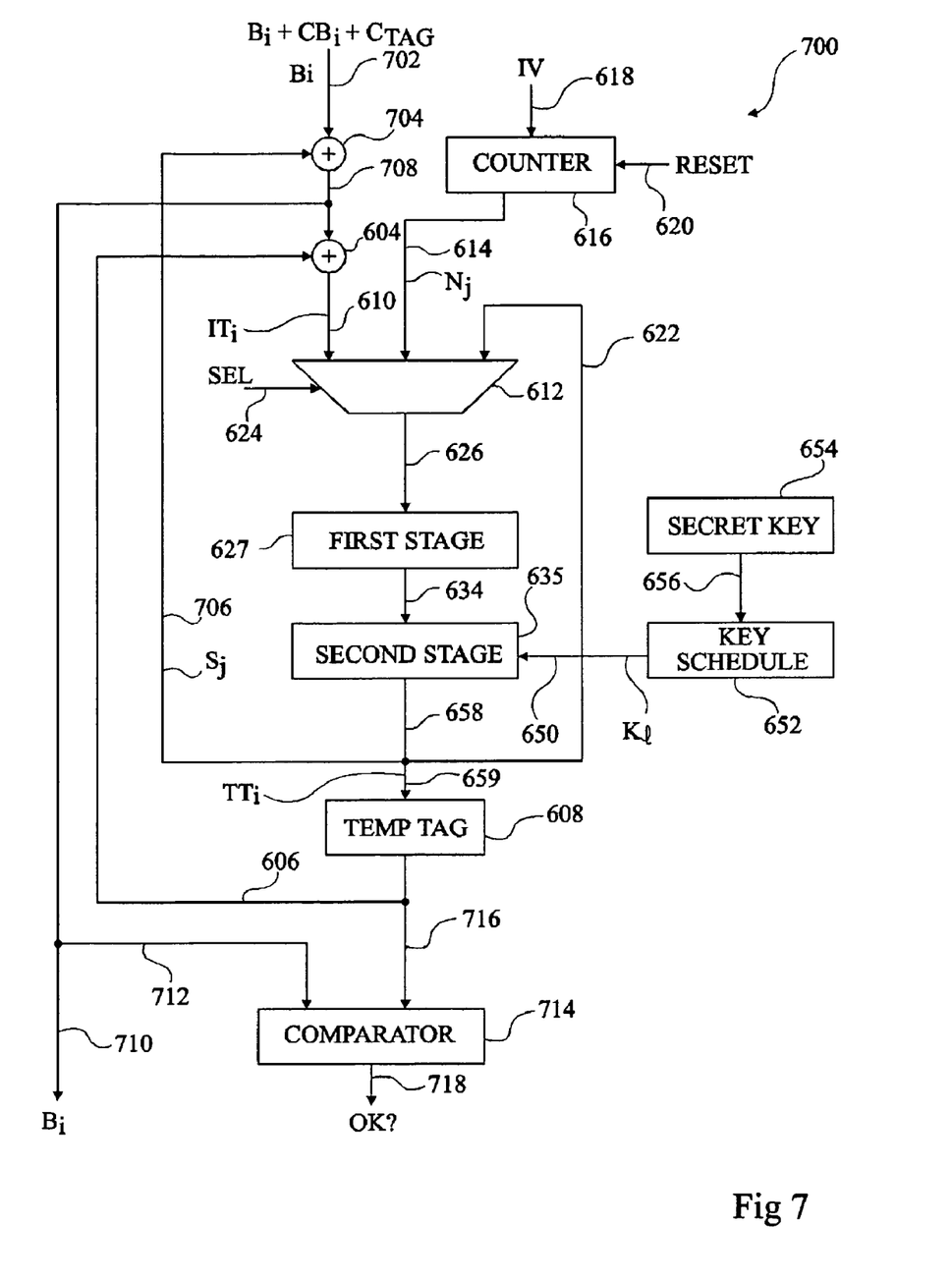
FIG. 7 illustrates in schematic form pipelined circuitry for decrypting data and recalculating a tag according to the second embodiment.

FIG. 7 illustrates one embodiment of pipelined decryption circuitry. In FIG. 7, the parts identical or similar with the circuitry of FIG. 6 have been labeled with the same reference numerals as FIG. 6, and these elements will not be described again. The first and second pipeline stages 627, 635 have not been shown in detail in FIG. 7, but are similar to those stages in FIG. 6.

Circuit 700 comprises an input line 702 on which are inputted the received header data blocks which have not been encrypted, the encrypted data blocks $CB_i$ and the encrypted tag $C_{TAG}$. The circuit comprises an XOR gate 704 which decrypts the encrypted data blocks by performing an XOR function on them with the output of the second pipeline stage 635 received on line 706, and in particular with the appropriate pre-calculated decryption sequence $S_j$. The output of XOR gate 704 on line-708 is provided to an XOR gate 604, and is also output on line 710 providing the decrypted data block output of the circuit. This output is also provided via line 712 to a comparator 714, which also receives the output of the temporary tag register 608. Once the final tag has been calculated based on all of the received data blocks, it is stored in the temporary tag register 608 before being compared with the received decrypted tag on line 712. As before, if the tags match, the decrypted data blocks are deemed to be accurate, and can be processed as required. If the tags do not match however, this implies that the data has been corrupted, and therefore all of the received data block and the tag are, for example, destroyed.

Operation of the circuit of FIG. 7 is essentially the same as the operation of the circuit 600 of FIG. 6, except that the decryption sequence for each data block of the payload should be calculated in advance of the arrival of the encrypted data block so that the block may be decrypted before it is processed for calculating the tag value. Due to the nature of the XOR function, the decryption sequence for decrypting encrypted data blocks is in fact identical to the encryption sequence used to encrypt the data blocks.

Figure 8:
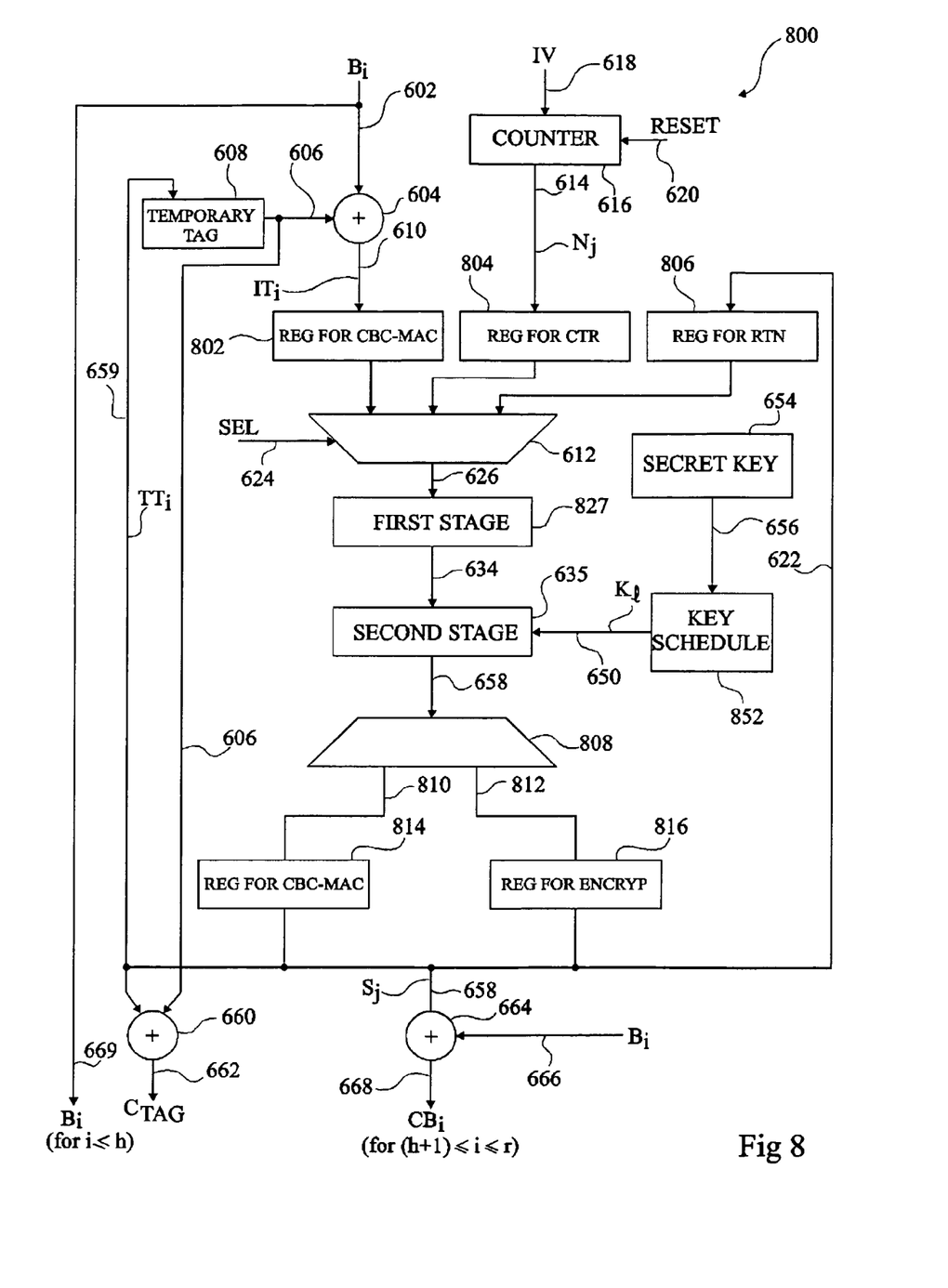
FIG. 8 illustrates in schematic form alternative pipelined circuitry for encrypting data and generating a tag according to the second embodiment.

FIG. 8 illustrates a variation to the pipelined encryption circuitry which provides a further reduction in the required hardware. Although not illustrated in FIG. 8, the first stage 827 of the pipeline is slightly different from the first stage 627 illustrated in FIG. 6 in that the SUBBYTES unit 632 of stage 827 comprises only four S-boxes rather than the full sixteen S-boxes required for the 128-bit data blocks. Thus data is provided to the pipeline in sub-blocks each comprising 32 bits. For this, the circuit comprises three additional input registers 802, 804 and 806 for receiving the input data block on line 610, the counter value on line 614, and the previous output of the pipeline on line 622 respectively. Each of these input registers receives 128 bits of data and divides these blocks into four sub-blocks of 32 bits for outputting sequentially to the pipeline.

The pipeline operates in the same fashion as previously, except that instead of processing a block it processes a sub-block on each period. The multiplexer 612 alternatively selects CBC-MAC data values and counter mode data values to be processed.

The 32-bit output from the pipeline on line 658 is provided to a multiplexer 808 which has two outputs on lines 810 and 812. The multiplexer is controlled to route the result to either a CBC-MAC output register 814 on line 810 or a counter mode register 818 on line 812. Once four processed sub-blocks have filled either of these output registers the 128-bit data value is provided to the output XOR gate 664, to the temporary tag register 608, or to the return register 806 ready to be processed again by the-pipeline.

Thus embodiments have been described above that reduce the hardware requirements of CCM encryption and decryption circuitry, and increase the processing speed of this circuitry.

Such encryption or decryption circuitry is of particular benefit in, for example, for wireless USB or in wireless LAN environments as described in the IEEE 802.11 protocol.

By providing two processing cores, one for performing the round logic for CBC-MAC, and one for performing counter mode round logic, the payload of a packet can be processed twice as quickly as if a single conventional processor core were used, one for generating the tag, and again for encrypting the payload. Furthermore, hardware resources are minimized by using a common key schedule unit for generating sub-keys for both processor cores at the same time. This is made possible by arranging the processor cores to operate on blocks of data approximately synchronously.

By pipelining a single processor core, it is possibly to process packet payloads for encryption and for generating a tag concurrently, and to perform these operations in approximately the time it would have taken to perform just one of these operations on a conventional single core architecture. The nature of the algorithms being performed do not make them immediately ideal for pipelining, particularly given that the output of one round is required before the next round may begin. By implementing a pipeline in which stages can be divided between the tag generation steps and the encryption generating steps, such that these processes can be performed concurrently, the throughput can be increased as well as reducing the required hardware. Again only a single key schedule block is required.

Whilst a number of particular embodiments have been described above, there are many variations or alterations to these embodiments that may be applied. In particular, features of any of the described embodiments may be combined in alternative embodiments.

Whilst the example of encrypting data and generating a tag based on a 128-bit key have been provided, the key, and the size of each data block, may be alternative lengths. The key schedule unit has been described as comprising S-boxes for generating sub-keys, however in alternative embodiments the sub-keys are a duplication of the secret key, or an alternative function there of.

The initialization value can be any value, and could for example comprise the source and/or destination address of the data. Furthermore, the unique count value can be generated using circuitry other than a counter.

Whilst the encryption or decryption of data has been described as being performed by XOR gates, it could be performed using alternative logic. This equally applies to the XOR gate in the ADDROUNDKEY operation which could comprise alternative logic.

Having thus described at least one illustrative embodiment of the invention, various alterations, modifications and improvements will readily occur to those skilled in the art. Such alterations, modifications and improvements are intended to be within the scope of the invention. Accordingly, the foregoing description is by way of example only and is not intended to be limiting. Further, the practical implementation of the present invention is in the ability of one with an ordinary skill in the art using common tools to obtain either a processor in wired logic, preferably programmable (FPGA).

The invention is limited only as defined in the following claims and the equivalent thereto.

What is claimed is:

1. At least one circuit for encrypting at least a part of an input data flow and generating a tag based on said input data flow with a same ciphering algorithm and a same key, said at least one circuit comprising a pipeline comprising:
   an input selection unit arranged to receive and to select one of:
      first input data for generating encryption sequences with said ciphering algorithm;
      second input data for generating temporary tags with said ciphering algorithm; and
      output data of the pipeline;
   a first stage comprising a first temporary storage element configured to receive an output of said input selection unit and at least a first operation unit; and
   a second stage comprising a second temporary storage element configured to receive an output of the first stage and at least a second operation unit and providing said output data of the pipeline, the first and second stages performing iterative computations of the ciphering algorithm, one or more operation units of the first and second stages being activated only in selected rounds of the iterative computations, the first and second stages of the pipeline, on successive rounds of the iterative computations, alternating between generating encryption sequences with said ciphering algorithm and generating the tag for data integrity, wherein common circuitry in the pipeline generates encryption sequences with said ciphering algorithm and generates the tag for data integrity on successive rounds of the iterative computations.

2. The at least one circuit of claim 1, further comprising a key schedule unit arranged to receive said key, to generate at least one sub-key based on said key, and to provide said at least one sub-key to said first or second stage.

3. The at least one circuit of claim 1, further comprising a first logic unit arranged to receive the output data of said second stage to encrypt said at least part of said input data flow.

4. The at least one circuit of claim 1, further comprising:
   a temporary tags storage unit adapted to receive the output data of said second stage; and
   a second logic unit arranged to receive said temporary tags and said input data flow, and to provide said second input data.

5. The at least one circuit according to claim 1, further comprising a logic unit for encrypting said tag.

6. The at least one circuit according to claim 1, wherein said input selection unit is arranged to, on each new first and second input data, output said new first and second input data alternately to said first stage.

7. The at least one circuit according to claim 6, wherein said ciphering algorithm comprises iterative loop rounds based on a plurality of sub-keys, said input selection unit being arranged to output said output data to said first stage of said pipeline after completion of at least one round processing at least one of the first and second input data.

8. The at least one circuit according to claim 7, wherein said algorithm is the AES algorithm.

9. The at least one circuit according to claim 8, further comprising temporary storage elements for synchronizing operation of the pipeline according to sub-blocks of data blocks.

10. At least one circuit for decrypting at least a cipher part of an input data flow and generating a tag based on said input data flow with a same algorithm and a same key, said at least one circuit comprising a pipeline comprising:
    an input selection unit arranged to receive and to select one of:
       first input data for generating decryption sequences with said ciphering algorithm;
       second input data for generating temporary tags with said ciphering algorithm; and
       output data of the pipeline;
    a first stage comprising a first temporary storage element configured to receive an output of said input selection unit and at least a first operation unit; and
    a second stage comprising a second temporary storage element configured to receive an output of the first stage and at least a second operation unit and providing said output data of the pipeline, the first and second stages performing iterative computations of the ciphering algorithm, one or more operation units of the first and second stages being activated only in selected rounds of the iterative computations, the first and second stages of the pipeline, on successive rounds of the iterative computations, alternating between generating encryption sequences with said ciphering algorithm and generating the tag for data integrity, wherein common circuitry in the pipeline generates encryption sequences with said ciphering algorithm and generates the tag for data integrity on successive rounds of the iterative computations.

11. The at least one circuit of claim 10, further comprising a key schedule unit arranged to receive said key, to generate at least one sub-key based on said key, and to provide said at least one sub-key to said first or second stage.

12. The at least one circuit of claim 10, further comprising a first logic unit arranged to receive the output data of said second stage to decrypt said at least part of said input data flow.

13. The at least one circuit of claim 10, further comprising:
    a temporary tags storage unit adapted to receive the output data of said second stage; and
    at least one second logic unit arranged to receive said temporary tags and said input data flow, and to provide said second input data.

14. The at least one circuit according to claim 10, further comprising a comparison unit to compare said generated tag with a received tag.

15. The at least one circuit according to claim 10, wherein said input selection unit is arranged to, on each new first and second input data, output said new first and second input data alternately to said first stage.

16. The at least one circuit according to claim 15, wherein said ciphering algorithm comprises iterative loop rounds based on a plurality of sub-keys, said input selection unit being arranged to output said output data to said first stage of said pipeline after completion of at least one round processing at least one of the first and second input data.

17. The at least one circuit according to claim 16, wherein said algorithm is the AES algorithm.

18. A wireless local area network element comprising at least one circuit for encrypting input data according to claim 1.

19. A wireless local area network element comprising at least one circuit for decrypting input data according to claim 10.

* * * * *

UNITED STATES PATENT AND TRADEMARK OFFICE
CERTIFICATE OF CORRECTION

PATENT NO.         : 8,233,619 B2
APPLICATION NO.    : 11/448425
DATED              : July 31, 2012
INVENTOR(S)        : Guido Bertoni et al.

Page 1 of 1

It is certified that error appears in the above-identified patent and that said Letters Patent is hereby corrected as shown below:

Col. 2, line 30, should read:
data), which are not to be encrypted and r-h payload data Signed and Sealed this
Eleventh Day of September, 2012

David J. Kappos
*Director of the United States Patent and Trademark Office*